March 10, 1964
C. H. MAY ETAL
3,124,113
COMBUSTION SYSTEM FOR INTERNAL COMBUSTION ENGINES
Filed June 20, 1962
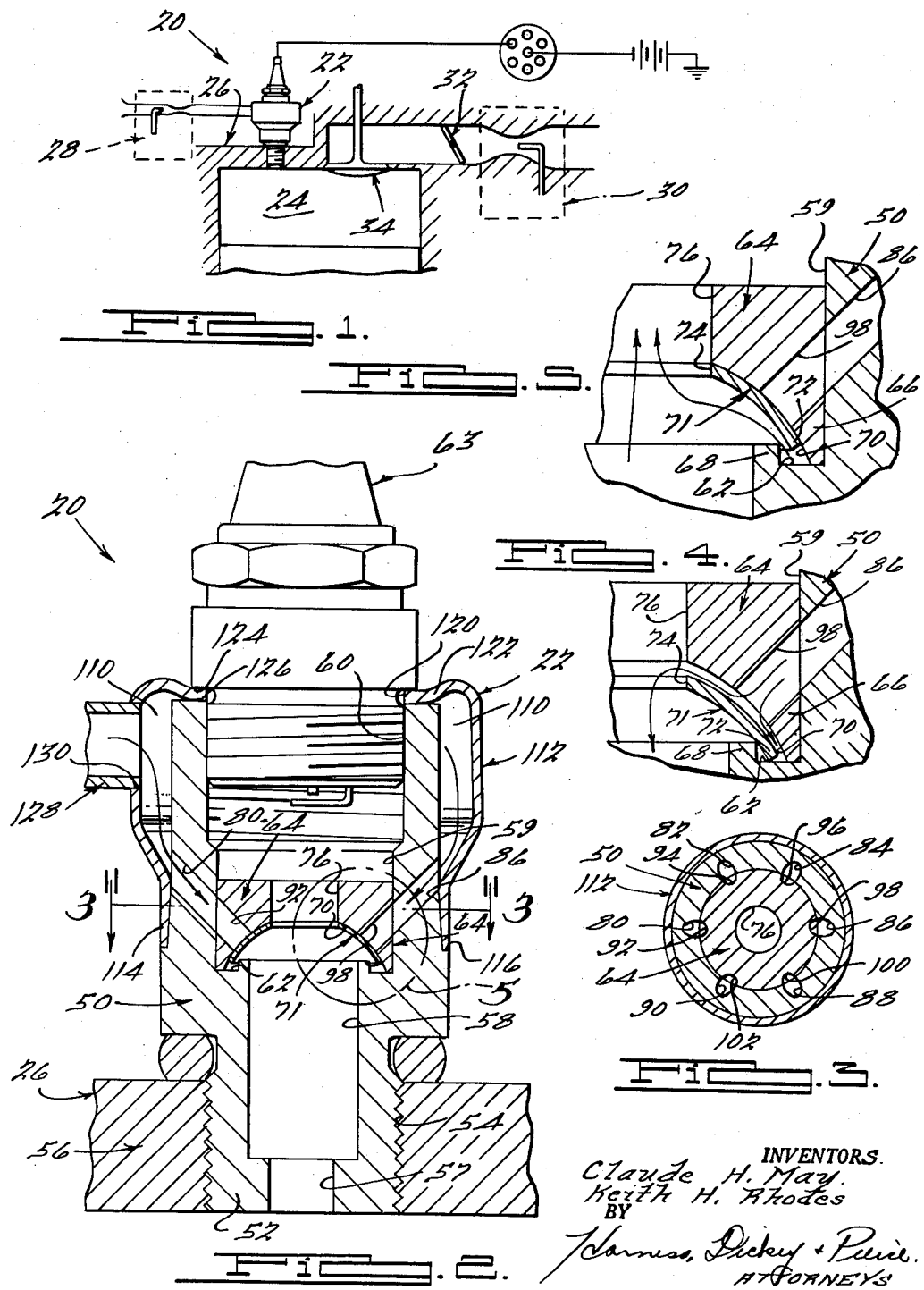
INVENTORS.
Claude H. May.
Keith H. Rhodes
BY
Harness, Dickey & Pierce.
ATTORNEYS

United States Patent Office

3,124,113
Patented Mar. 10, 1964

3,124,113
COMBUSTION SYSTEM FOR INTERNAL
COMBUSTION ENGINES
Claude H. May and Keith H. Rhodes, Racine, Wis., assignors to Walker Manufacturing Company, Racine, Wis., a corporation of Delaware
Filed June 20, 1962, Ser. No. 203,883
3 Claims. (Cl. 123—75)

This invention relates to an improved combustion system for an internal combustion engine.

It has long been a problem to utilize the advantages inherent in the combustion of relatively lean air-fuel mixtures, for example, a mixture of one part of gasoline to twenty parts of air, without deleteriously affecting operation of an internal combustion engine in other respects. This problem is solved, in accordance with the present invention, by providing a relatively small auxiliary combustion chamber for the main combustion chamber of the engine that functions to ignite a pilot air-fuel mixture. A relatively rich mixture of air and fuel is introduced into the auxiliary combustion chamber, a portion of which is retained therein for subsequent mixing with an air charge on the compression stroke of the engine thereby to form the pilot mixture. Sufficient fuel is introduced through the auxiliary combustion chamber to effect idle of the engine as well as to torch off relatively lean air-fuel mixtures introduced directly into the main combustion chamber of the engine under increased load conditions.

Accordingly, one object of the present invention is an improved combustion system for an internal combustion engine.

Another object is a combustion system that is compatible with existing internal combustion engine constructions.

Another object is a combustion system wherein an air charge is introduced to and mixed with a fuel charge residing in an auxiliary combustion chamber, ignition of the subsequent mixture effecting ignition of a relatively lean air-fuel mixture in a main combustion chamber.

Other objects and advantages of the present invention will become apparent from the following description wherein reference is made to the drawings in which:

FIGURE 1 is a diagrammatic view of an auxiliary combustion system, in accordance with the present invention, in association with an internal combustion engine;

FIG. 2 is a sectional side view of the auxiliary combustion chamber of FIGURE 1;

FIG. 3 is a cross-sectional view taken generally along the line 3—3 of FIG. 2;

FIG. 4 is a cross-sectional view taken within the circle "4" of FIG. 2 with the intake valve of the auxiliary combustion chamber in the open condition; and FIG. 5 is a cross-sectional view similar to FIG. 4 with the intake valve in the closed condition.

As best seen in FIGURE 1, a combustion system 20, in accordance with an exemplary embodiment of the present invention, comprises an auxiliary combustion chamber 22 that communicates with a main combustion chamber 24 of an internal combustion engine 26. A relatively rich air-fuel mixture is introduced into the auxiliary combustion chamber 22 from a simple auxiliary carburetor 28. The weight of the air-fuel introduced into the auxiliary combustion chamber 22 is sufficient to effect idling of the engine 26, no air-fuel mixture being supplied thereto by a main carburetor 30 at idle conditions. The main carburetor 30 is throttled by a conventional throttle plate 32, whereas the auxiliary carburetor 28 is unthrottled. When increased power is demanded from the engine 26, the main carburetor 30 provides either a richer mixture or a greater weight of relatively lean mixture through a main engine intake valve 34. Under part-load conditions, a relatively lean mixture is fed from the carburetor 30 to the main combustion chamber 24 of the engine 26 and a relatively rich mixture fed from the auxiliary carburetor 28 to the auxiliary combustion chamber 22. Even with an abnormally lean mixture in the main combustion chamber 24, the heat release from combustion of the pilot charge in the auxiliary combustion chamber 22 is sufficient to ignite the lean charge in the main combustion chamber 24 because the burning pilot charge is injected at relatively high velocity from the auxiliary combustion chamber 22 constituting a multiple ignition source of sufficient heat value to effect ignition of the relatively lean main charge.

As will be discussed in greater detail, the auxiliary combustion system 22 of the instant invention differs materially from such systems heretofore known and used in that a residual fuel charge is trapped during the induction stroke to which an air or relatively lean air-fuel charge is introduced on the compression stroke to form a pilot charge that is compressed and subsequently ignited.

More particularly, the auxiliary combustion chamber 22 comprises a tubular housing 50 having an externally threaded lower end portion 52 that is accepted in a complementary threaded aperture 54, for example, the conventional spark plug aperture, in a cylinder head 56 of the engine 26.

The housing 50 has a central bore 57 at the lower end thereof defining a throat leading into the main combustion chamber 24 of the engine 26. The housing 50 has an intermediate bore 58 of relatively larger diameter than the throat 57 and an axially aligned bore 59 at the upper end thereof having an internally threaded portion 60 for the acceptance of a spark plug 63. A radial shoulder 62 extends between the bores 58 and 59 for the seating of a complementary valve seat insert 64. It is to be noted, as best seen in FIGS. 4 and 5, that a lower edge portion 66 of the valve seat 64 is of relatively smaller radial dimension than the radial shoulder 62 so that the shoulder 62, in combination with an upstanding lip 68 on the radially inner edge thereof, defines a depressed fuel-retaining annulus, the function of which will be described hereinafter.

A lower end face 70 of the valve seat 64 is of truncated spherical cross-sectional configuration for the seating of an intake valve 71. The valve 71 is of truncated spherical cross section complementary to the lower end face 70 of the valve seat 64, a lower edge portion 72 thereof being engageable with the shoulder 62 to define a lowermost or unseated position for the valve 71. The valve 71 has a central aperture 74 therein aligned with a central bore 76 in the valve seat 64 for the passage of air and fuel into proximate relation to the spark plug 63.

The housing 50 has a plurality of downwardly convergent bores 80, 82, 84, 86, 88 and 90 (FIG. 3) therein that communicate with aligned downwardly convergent bores 92, 94, 96, 98, 100 and 102 in the valve seat 64 for the passage of a relatively rich air-fuel mixture from an annular chamber 110 surrounding the housing 50, past the valve 71 into the bore 50 of the auxiliary combustion chamber 22.

The annular chamber 110 is defined by a cup-shaped shroud 112, a lower edge portion 114 of which is seated against an annular shoulder 116 on the outer periphery of the housing 50. The shroud 112 is engageable with the housing 50 with a sealing press fit. The shroud 112 has an aperture 120 in an upper end 122 thereof for the acceptance of the spark plug 63. It is to be noted that the radially inwardly extending upper edge portion 122 of the shroud 112 functions as a sealing gasket between a seating shoulder 124 on the spark plug 63 and an annular upper edge face 126 on the housing 50.

A tubular conduit 128 is secured in a complementary aperture 130 in the shroud 112 in fluid-communicating relation to provide for the passage of a relatively rich air-fuel mixture from the auxiliary carburetor 28 to the auxiliary combustion chamber 22.

In operation, the auxiliary combustion chamber 22 inhales a relatively rich air-fuel mixture during the intake stroke of the engine 26, some of which is drawn over the valve 71 and downwardly through the central aperture 74 therein into the engine combustion chamber 24.

However, in accordance with the instant invention, the upwardly facing lip 68 on the housing 50, directly beneath the lower edge 72 of the valve 71 traps some liquid fuel during the inhalation phase of the engine cycle. As the engine begins its compression stroke, the valve 71 is forced, by differential pressure, onto its spherical seat 70 in the valve seat 64, preventing leak-back of compression pressure into the annular chamber 110 between the shroud 112 and the housing 50. Air, or a relatively lean air-fuel mixture, from the main combustion chamber 24, rushes upwardly through the aligned bores 57 and 58 in the housing 50 with a high degree of turbulence, picking up the fuel retained on the shoulder 62 during the inhalation phase of the cycle, mixing therewith and presenting a burnable mixture to the spark plug 63. After ignition, the burning mixture is rapidly ejected downwardly into the main combustion chamber 24 of the engine 26.

From the foregoing description, it should be apparent that the auxiliary combustion chamber 22 of the instant invention provides for the introduction of an air or relatively lean air-fuel mixture to a fuel charge. This is in contradistinction to heretofore known injection systems wherein fuel is introduced to the air charge as by injection.

The hot torch from the auxiliary combustion chamber 22 ignites the relatively lean mixture in the combustion chamber 24, burning it completely and quickly, resulting in a fuel saving and minimizing unburned hydrocarbons. The engine 26 is controlled by the throttle plate 32 on the main carburetor 30 which introduces varying weights of relatively high air-fuel ratio mixtures into the main combustion chamber 24.

It is to be noted that the carburetor 30 does not require an idle system. All idling engine fuel is introduced by the auxiliary combustion chamber carburetor 28 through the auxiliary combustion chamber 22. As engine load and speed are increased, the main carburetor 30 increases the weight of fuel in its mixtures until, at full load, nearly stoichiometric mixtures are introduced through the intake valve 34 from the carburetor 30.

It is to be understood that the specific construction of the improved automotive device herein disclosed and described is presented for the purpose of explanation and illustration and is not intended to indicate limits of the invention, the scope of which is defined by the following claims.

What is claimed is:

1. A combustion system for an internal combustion engine having a main combustion chamber, said system comprising
    an auxiliary combustion chamber having an aperture communicating with the main combustion chamber,
    an auxiliary carburetor for supplying an unthrottled relatively rich auxiliary fuel-air mixture to said auxiliary combustion chamber,
    an inlet valve in said auxiliary combustion chamber for controlling the flow of the relatively rich air-fuel mixture thereinto,
    a recessed channel in said auxiliary combustion chamber adjacent said inlet valve and aperture for trapping a portion of the fuel in said auxiliary air-fuel mixture,
    a second carburetor for supplying a relatively lean air-fuel mixture to said main combustion chamber related to engine load,
    a second inlet valve for introducing said relatively lean air-fuel mixture into the main combustion chamber, and
    a spark plug in said auxiliary combustion chamber for igniting the mixture therein, flow of said relatively lean air-fuel mixture from said main combustion chamber to said auxiliary combustion chamber picking up a portion of the fuel in said channel to present a combustible air-fuel mixture to said spark plug, ignition of said combustible mixture effecting ignition of the relatively lean mixture in the working cylinder of the engine.

2. A combustion system for an internal combustion engine having a main combustion chamber, said system comprising
    a cylindrical auxiliary combustion chamber having a central aperture communicating with the main combustion chamber,
    an auxiliary carburetor for supplying an unthrottled relatively rich auxiliary fuel-air mixture to said auxiliary combustion chamber,
    an annular inlet valve in said auxiliary combustion chamber for controlling the flow of the relatively rich air-fuel mixture thereinto, said inlet valve having
        a central aperture aligned with the central aperture of said auxiliary combustion chamber,
    an annular channel in said auxiliary combustion chamber about said inlet valve for trapping a portion of the fuel in said auxiliary air-fuel mixture,
    a second carburetor for supplying a relatively lean air-fuel mixture to said main combustion chamber related to engine load,
    a second inlet valve for introducing said relatively lean air-fuel mixture into the main combustion chamber, and
    a spark plug in said auxiliary combustion chamber for igniting the mixture therein, flow of said relatively lean air-fuel mixture through the aperture in said auxiliary combustion chamber picking up a portion of the fuel trapped in said channel thereby to present a combustible air-fuel mixture to said spark plug, ignition of said combustible mixture effecting ignition of the relatively lean mixture in the working cylinder of the engine.

3. A combustion system for an internal combustion engine having a main combustion chamber, said system comprising
    a cylindrical auxiliary combustion chamber having
        a central aperture communicating with the main combustion chamber and an annular radially extending fuel channel on the inner peripheral wall thereof, said combustion chamber having
    an annular valve seat concentric with and axially spaced from the fuel channel thereof,
    an auxiliary carburetor for supplying an unthrottled relatively rich auxiliary air-fuel mixture to said auxiliary combustion chamber,
    an annular inlet valve seatable on the valve seat of said combustion chamber for controlling the flow of the relatively rich air-fuel mixture between said auxiliary carburetor and auxiliary combustion chamber, said inlet valve having
        a central aperture aligned with the central aperture of said auxiliary combustion chamber to permit fluid flow therethrough between said main and auxiliary combustion chambers,
    a second carburetor for supplying a relatively lean air-fuel mixture to said main combustion chamber related to engine load,
    a second inlet valve for introducing said relatively lean air-fuel mixture into the main combustion chamber, and a spark plug in said auxiliary combustion chamber for igniting the mixture therein, flow of said relatively rich fuel-air mixture into said auxiliary combustion chamber being directed over said channel to deposit a portion of the liquid fuel therein in said channel, flow of said relatively lean air-fuel mixture into said auxiliary combustion chamber from the main combustion chamber of the engine picking up a portion of the fuel trapped in said channel thereby to present a combustible air-fuel mixture to said spark plug, ignition of said combustible mixture effecting ignition of the relatively lean mixture in the working cylinder of the engine.

References Cited in the file of this patent

UNITED STATES PATENTS

| | | |
|---|---|---|
| 1,998,785 | Mock | Apr. 23, 1935 |
| 2,098,875 | Mallory | Nov. 9, 1937 |
| 2,156,665 | Mallory | May 2, 1939 |
| 2,184,357 | Mallory | Dec. 26, 1939 |
| 2,690,741 | Broderson | Oct. 5, 1954 |
| 2,983,268 | Heintz | May 9, 1961 |

FOREIGN PATENTS

| | | |
|---|---|---|
| 720,374 | France | Dec. 3, 1931 |
| 196,270 | Great Britain | July 3, 1924 |